(No Model.)
T. H. HABERKORN.
COMBINATION VALVE FOR AIR BRAKES.
No. 417,721.
Patented Dec. 24, 1889.
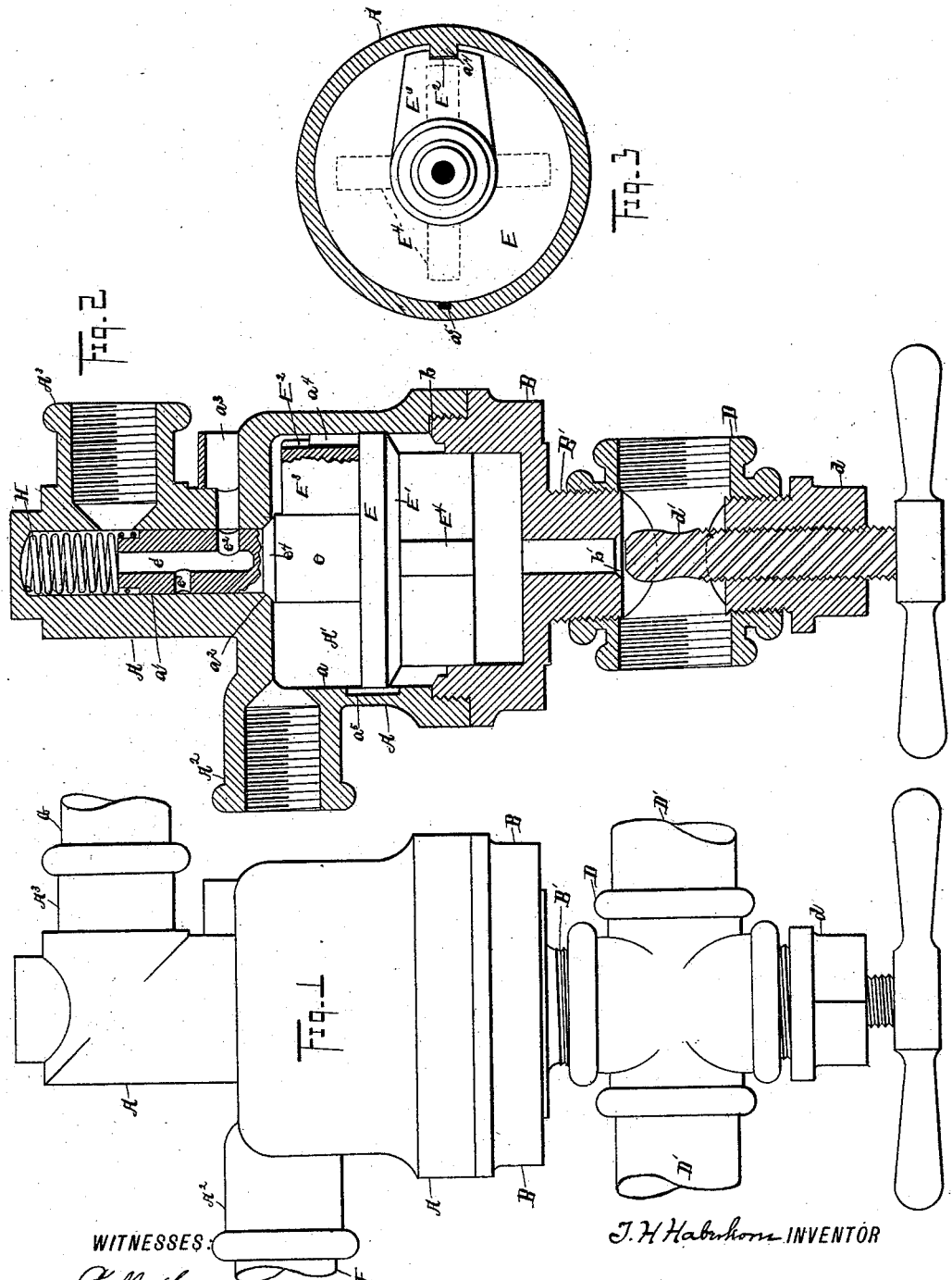
WITNESSES:
Bell Lowrie.
Geo. W. King
T. H. Haberkorn INVENTOR
BY Liggett & Liggett
ATTORNEYS

UNITED STATES PATENT OFFICE.

THEODORE H. HABERKORN, OF FORT WAYNE, INDIANA.

COMBINATION-VALVE FOR AIR-BRAKES.

SPECIFICATION forming part of Letters Patent No. 417,721, dated December 24, 1889.

Application filed June 21, 1888. Serial No. 277,737. (No model.)

*To all whom it may concern:*

Be it known that I, THEODORE H. HABERKORN, of Fort Wayne, in the county of Allen and State of Indiana, have invented certain new and useful Improvements in Combination-Valves for Air-Brakes; and I do hereby declare the following to be a full, clear, and exact description of the invention, such as will enable others skilled in the art to which it pertains to make and use the same.

My invention relates to improvements in combination-valves for air-brakes, the object being to provide a valve extremely sensitive and prompt in action and completely under the control of the operator.

With these objects in view my invention consists in certain features of construction and in combination of parts, hereinafter described, and pointed out in the claims.

My present invention is designed as an improvement on a valve for which United States Letters Patent No. 335,446 were granted to me February 2, 1886, and to which reference is made.

In the accompanying drawings, Figure 1 is a side elevation. Fig. 2 is an elevation in section through the center of the device. Fig. 3 is a bottom plan of the valve, showing also a section of the casing.

A represents the valve-casing, a preferable external form of which, together with its upright position, is shown more clearly in Fig. 1. The enlarged lower section of the casing, and at the lower end thereof, is screw-threaded internally for receiving cap B. The latter has a depending nozzle B', screw-threaded externally for connecting with cross-fitting D. In the side openings of the latter connect the main air-supply pipes D', leading from the main air-reservoir. The lower opening of the fitting is provided with plug $d$, this plug having a central screw-threaded opening for engaging the screw-threads of valve $d'$. The inner upper end of this valve when screwed in engages seat $b'$ of nozzle B', by means of which the air is shut off from the brake mechanism of the car in case such mechanism for any reason is not wanted and is to remain inoperative for a time; otherwise the valve remains open. The upper inner edge of cap B is beveled off to form a valve-seat $b$. The larger member of the casing has a cylindrical bore $a$, of considerable size, and the reduced member of the casing has a much smaller bore $a'$, the two bores having an axial line in common and the larger member of the casing inclosing a chamber A'. The casing has lateral nozzles $A^2$ and $A^3$, the former being in open relation with chamber A' and connecting with pipe F, the latter leading to the auxiliary air-reservoir with which each car is supposed to be provided. Nozzle $A^3$ connects with pipe G, the latter pipe leading to the air-cylinder of the brake mechanism of the car. The valve operating in this casing is constructed as follows:

E is a disk fitting nicely bore $a$, the lower edge of the disk having a seat E', adapted to engage seat $b$ aforesaid. Integral with the disk are depending wings $E^4$, that fit easily in the bore of the cap for guiding the valve. From the center of the disk upward extends plug $e$, fitting bore $a'$ of the casing. The plug has a central bore $e'$, extending from the upper end of the plug downward and connecting with lateral holes $e^2$ and $e^3$. A coil-spring H, of considerable tension, abuts the upper end of the plug $e$, and is preferably fastened to the plug, the upper end of the spring abutting the inner surface of the upper end of the casing. When the valve is in its elevated position with seats $e^4$ of the valve engaging seats $a^2$ of the casing, lateral hole $e^2$ registers with exhaust-orifice $a^3$, the latter leading through the wall of the casing and discharging into the atmosphere. When the valve is depressed, with its seat E' engaging seat $b$, hole $e^2$ opens into chamber A', and thus opens communication between the auxiliary air-reservoir and the air-cylinder for operating the brakes, by means of which the brakes are set. Hole $e^3$ causes a pressure in the opposite direction, that in turn causes plug $e$ to hug the casing close on the side where the exhaust-opening is located. The enlarged section of the casing is provided internally with vertical rib $a^4$, the same fitting easily in groove $E^2$ of lug $E^3$, the latter being integral with the valve, by which arrangement the valve is prevented from turning on its axis. A small short internal vertical groove $a^5$ is made in the wall of the enlarged portion of the casing, the length and position vertically of this groove being such that when the valve is in its elevated position, whereby seats $a^2$ and $e^4$ are in contact, cutting off communication from chamber $A^2$ with the air-cylinder, air from the main pipe is admitted by means of groove $a^5$ past disk E, and this air passes through pipe F into the auxiliary reservoir, by means of which the latter is kept replenished with compressed air. In depressing the valve the lower edge of disk E passes the lower edge of groove $a^5$ and cuts off this communication just in advance of the orifice $e^2$, opening into chamber A', by reason of which all communication from the main air-pipe is cut off before communication is opened between the auxiliary air-reservoir and the air-cylinder. Groove $a^5$, although diminutive in size, is ample for supplying the auxiliary air-reservoir from the fact that it remains constantly open, except during the short intervals that the brakes are in operation, and by reason of the diminutive size of this groove, when the pressure is reduced in the main air-pipe for shifting the valve, the amount of air forced back from the auxiliary reservoir through this groove during the moment of time that the valve is shifting is merely nominal. With the valve in its elevated position and with the auxiliary reservoir filled with compressed air, so that the air-pressure therein is approximately the same as the pressure in the main air-pipe, there will still be a preponderance of pressure on the under side of disk E from the fact that the exposed upper surface of this disk is reduced in area by plug $e$. If spring H were omitted, a sufficient reduction of pressure below the valve would cause the latter to descend by gravity; but in such case the movement of the valve would be comparatively sluggish in that it would not start promptly, and when the inertia and friction were overcome the valve, although deliberate in starting, would likely persist in moving its full throw and with accelerated movement common to falling bodies, so that when the point was reached for opening orifice $e^2$ into chamber A' this opening of the port would be approximately instantaneous, thus, in the first instance, admitting a full head of compressed air into the air-cylinder. Now, promptness of action, together with the mechanism being under the perfect control of the operator, are among the most desirable features of any system of air-brakes.

Spring H performs important functions, the results of which render the valve extremely sensitive and prompt in action and cause the valve to be entirely under the control of the operator. The greatest tension of the spring had with the valve in its elevated position nearly balances the valve as against the preponderance of pressure on the lower side of the valve with full pressure in the main air-pipe. With a slight reduction of pressure in the main air-pipe the recoil of the spring will instantly start the valve on its downstroke; but as the valve descends the spring relaxes, so that the tension of the spring gradually decreases in force. Therefore, with a slight reduction of pressure under the valve, the latter will quickly move downward, but will only move part way of its throw, such downward movement of the valve being more or less, according to the reduction of pressure below, and a still further reduction in such pressure will be necessary to cause the valve to descend its full stroke. If, therefore, the pressure below the valve is gradually reduced, the valve will as gradually descend and the opening of the port to admit air to the cylinder will be correspondingly gradual. On the other hand, and in case of emergency, a quick and radical reduction of pressure below the valve will cause the latter to descend quickly to the end of its stroke, thereby instantly opening a full port for the admission of air to the air-cylinder. With the valve in its depressed position a gradual increase of pressure in the main air-pipe will cause the valve to rise gradually, thereby gradually closing the induction-port to the air-cylinder and as gradually opening the exhaust-port. A quick increase of pressure below the valve would cause the valve to rise quickly, closing the induction-port and quickly opening the exhaust-port. It will be seen, therefore, that the engineer, by manipulating the valve that controls the pressure in the main air-pipe, can control perfectly the valve for operating the air-brake and can at will instantly or gradually apply or release the brakes of the train.

I do not wish to limit myself to the precise form of the valve and casing, as these may be varied to some extent without departing from the spirit and purpose of my invention. Also, the upright position of the valve and casing, although preferable, may be departed from without seriously affecting the operation of the valve.

What I claim is—

1. The combination, with the valve-casing provided with main air inlet or supply port, the by-pass $a^5$, and outlets $A^2$ and $a^3$, of the differential piston-valve E $e$ $e^4$, the outlet-passages $e'$ $e^2$, and the spring H, arranged to force the valve in opposition to the force exerted by the air-supply on its largest end, substantially as set forth.

2. The combination, with a casing composed of a large and small chamber, a nozzle opening into each, and an induction-port into the larger chamber and an exhaust-port out of the smaller chamber, of a differential piston-valve rigidly connected and closely fitting the chambers, and adapted when in one position to open communication between the induction-port and nozzle in the larger chamber and the nozzle and exhaust-port of the smaller chamber and shut off communication between the two chambers, and when in its other position to shut off communication between the induction-port and nozzle in the larger chamber and the nozzle and exhaust-port of the smaller chamber and open communication between the two chambers, a spring acting on the valve on the side of its smaller surface, and a valve for controlling the supply of air to the induction-port, substantially as set forth.

In testimony whereof I sign this specification, in the presence of two witnesses, this 26th day of March, 1888.

THEODORE H. HABERKORN.

Witnesses:
R. S. ROBERTSON,
N. A. ROBERTSON.